P. M. LINCOLN.
TIMING DEVICE.
APPLICATION FILED SEPT. 2, 1914.
1,235,579.
Patented Aug. 7, 1917.
3 SHEETS—SHEET 1.
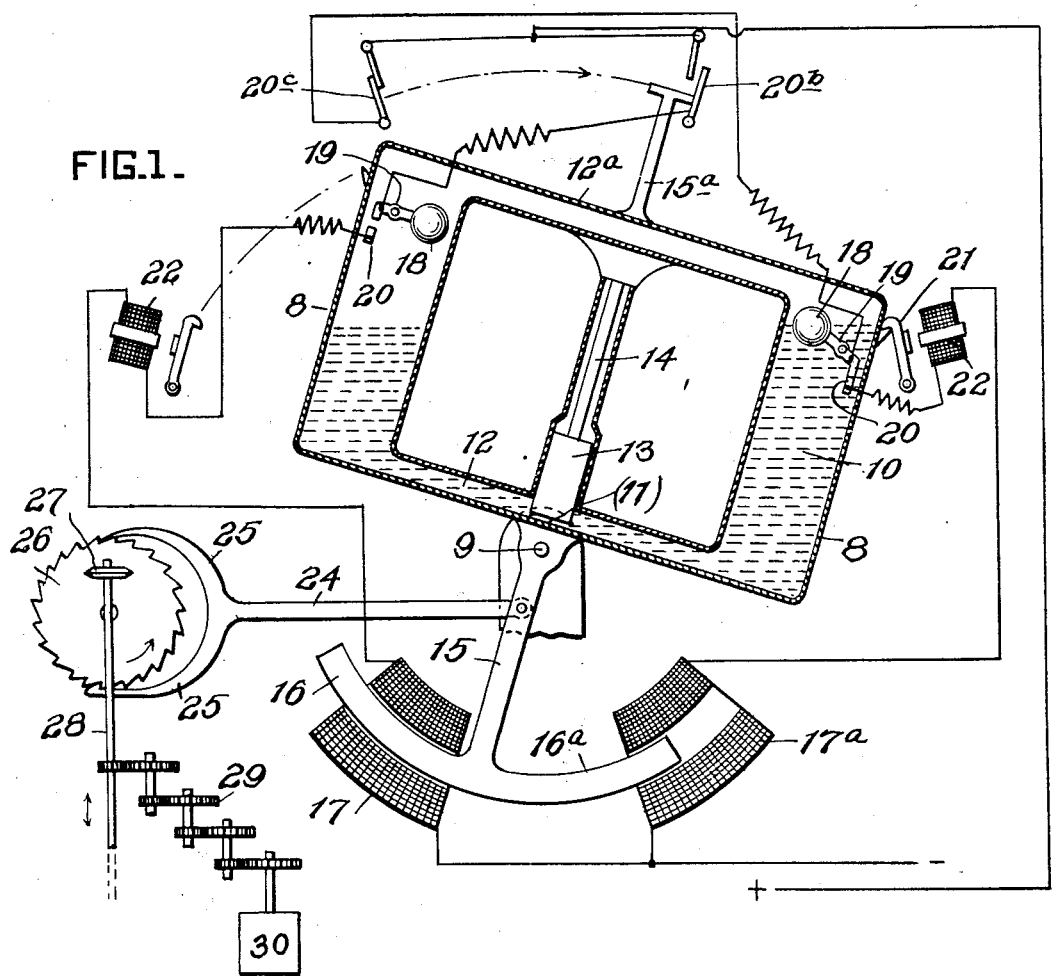
FIG. 1.
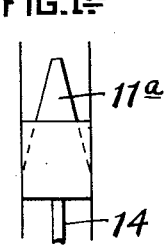
FIG. 1ᵃ
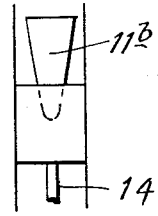
FIG. 1ᵇ
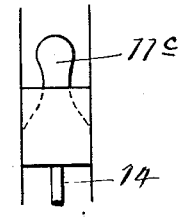
FIG. 1ᶜ
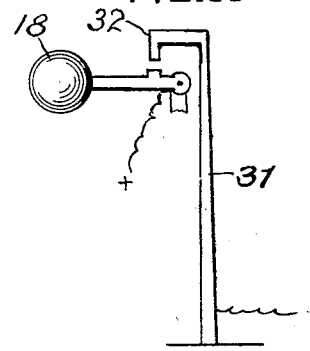
FIG. 1ᵈ
WITNESSES
J. Herbert Bradley.
W. A. Heckman
INVENTOR
Paul M. Lincoln
By F. W. H. Clay
his Atty.

P. M. LINCOLN.
TIMING DEVICE.
APPLICATION FILED SEPT. 2, 1914.
1,235,579.
Patented Aug. 7, 1917.
3 SHEETS—SHEET 2.
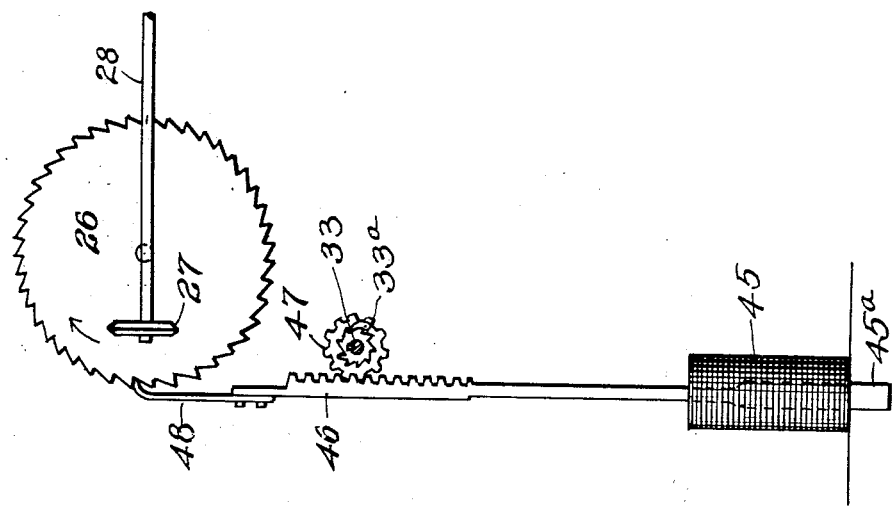
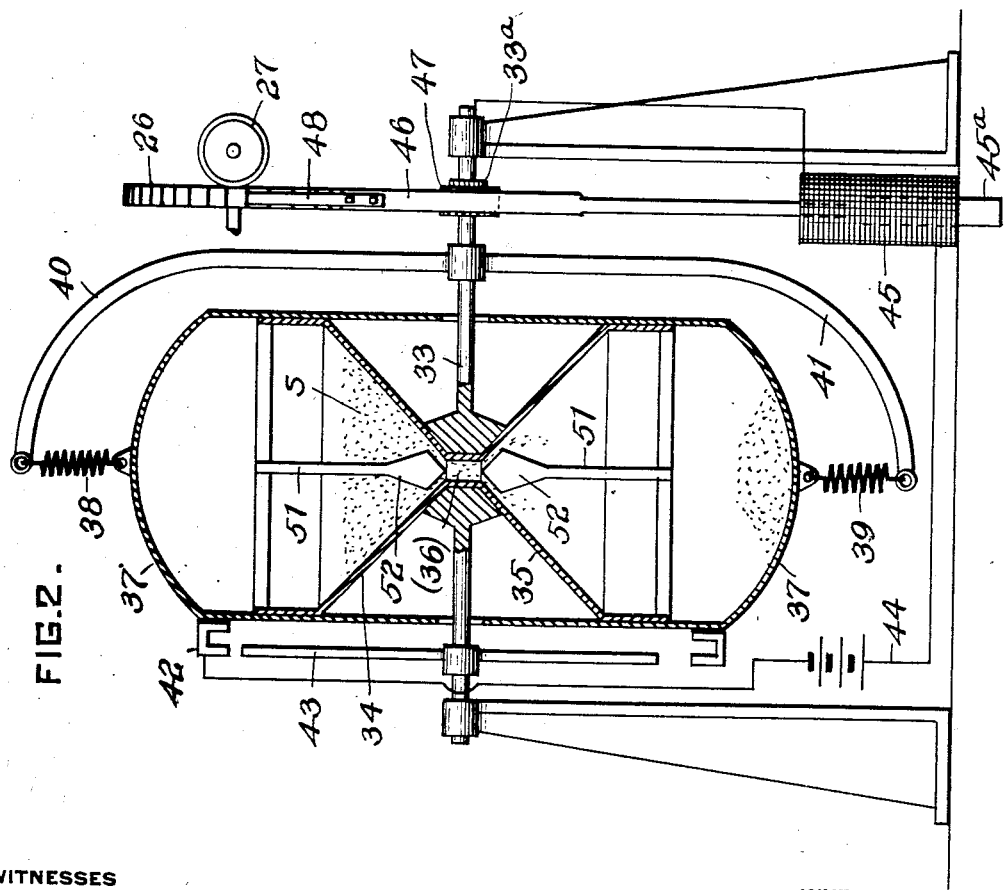

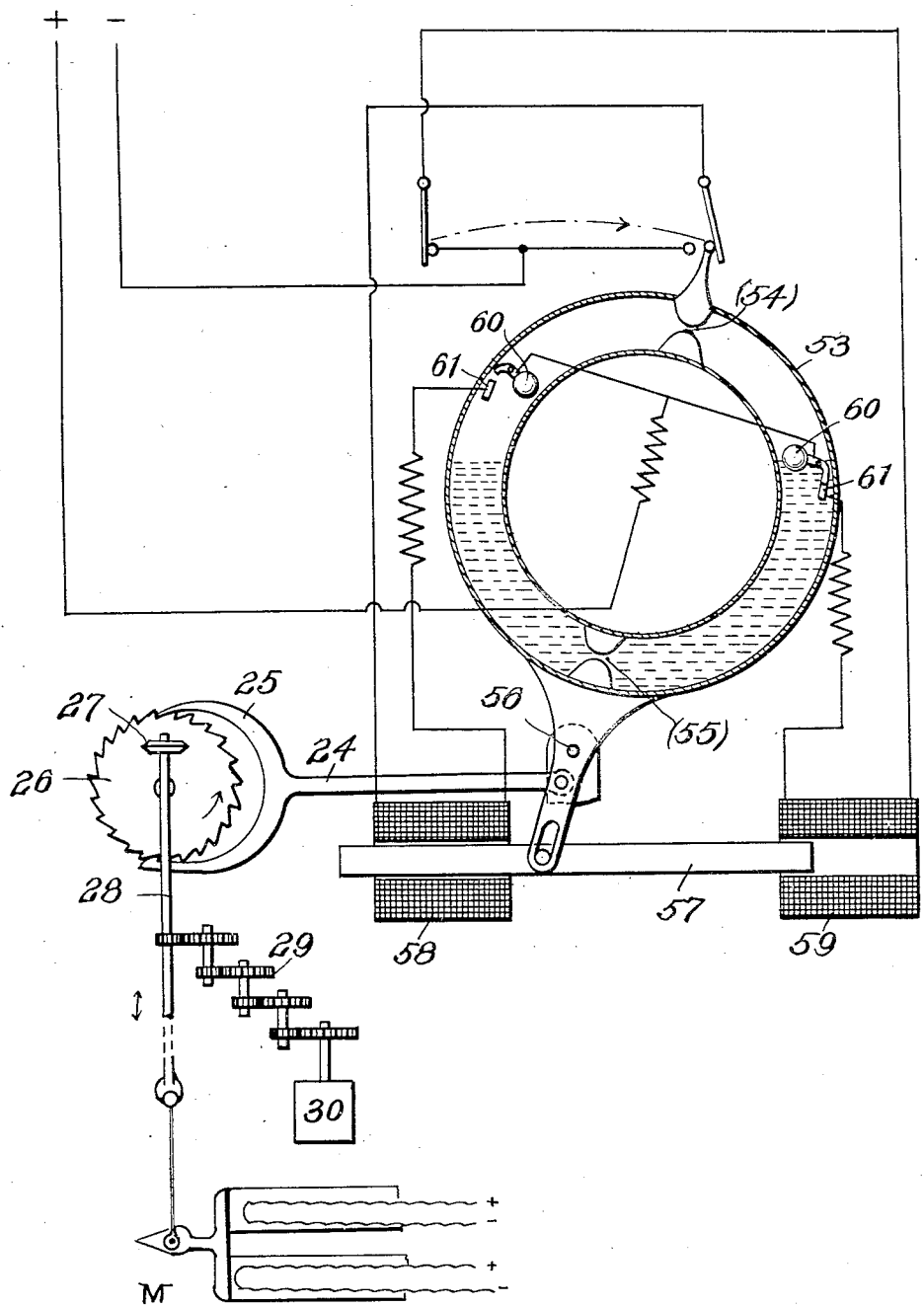

UNITED STATES PATENT OFFICE.

PAUL M. LINCOLN, OF PITTSBURGH, PENNSYLVANIA.

TIMING DEVICE.

1,235,579. Specification of Letters Patent. Patented Aug. 7, 1917.

Application filed September 2, 1914. Serial No. 859,775.

*To all whom it may concern:*

Be it known that I, PAUL M. LINCOLN, a citizen of the United States, residing at Pittsburgh, in the State of Pennsylvania, have invented certain new and useful Improvements in Timing Devices, of which the following is a specification.

My invention relates to means for regulating the time of movement of mechanisms, as, for example, the recorders for electric meters of various kinds, where a simple, cheap and accurate timing device is useful, the primary object of the invention being to improve the accuracy and reliability of such devices. I have illustrated the invention in several forms in the accompanying drawings, in which—

Figure 1 is a diagrammatic view and partial vertical section through a mechanism adapted for my purpose, and shown as operating the recorder of an electric meter;

Figs. 1$^a$, 1$^b$ and 1$^c$ show modified forms of the liquid orifice at the point 11 in Fig. 1;

Fig. 1$^d$ shows a modified form of electric switch for use in this mechanism;

Fig. 2 is a side elevation and vertical section of another form of timing device, operating on the hour glass principle;

Fig. 3 is a partial elevation at right angles to that of Fig. 2, showing the actuator for the recording mechanism; and Fig. 4 is a vertical section and diagram in side elevation of another form of timing device.

A form of clock, in which is employed the principle of a liquid flowing or trickling slowly through a small orifice, is a very ancient device: but it was innately and grossly inaccurate, because of the variation in the viscosity of liquids with variations of temperature. I find that instruments operating on this general principle may, however, be made of sufficient accuracy for my purposes, as by making the orifice vary in proportion to the variations of viscosity, and by other provisions for compensating for variations of viscosity due to temperature changes.

For example, in Fig. 1, I show a U-tube 8, mounted to rock on a pivot 9, and containing a liquid 10, which, as the containing vessel is rocked, must pass through a small orifice 11, formed between the sides of the connecting tube 12 and a plunger 13, supported at the free end of an expansible bar 14, which is rigidly supported at its upper end, so as to have a fixed relation to the U-tube. The metal of the bar 14 is so chosen that with a rise of temperature, which decreases the viscosity of most liquids, the bar 14 will expand and make the orifice 11 smaller, so that the rate of flow of the liquid through the orifice will be independent of the temperature of the liquid or the surrounding air. I may employ any convenient means for rocking the U-tube 8, as, for example, I here show an arm 15 rigidly attached to it below its pivot point 9, and carrying the plungers 16, 16$^a$, of solenoids 17 and 17$^a$. Inside the vessel 8, I provide at each side a float 18 pivoted at 19, and carrying an arm making electric contact with a fixed electrode 20, which is arranged in an electric circuit so as to excite the corresponding solenoid as 17 or 17$^a$ to tilt the vessel in the opposite direction, as soon as the liquid has risen high enough to raise the float 18 and make the contact 20. The U-tube then tilting to the left, the arm 15$^a$ breaks the switch 20$^c$. The operation will be apparent from the diagram. I also prefer to use a catching lug 21 to hold the vessel in the tilted position until released by exciting the electro-magnet 22, when the electric circuit is closed.

The regulated motion of the U-tube 8 may be imparted to a recording mechanism in any convenient manner. As here shown, the actuating bar 15 is pivoted to a link 24 carrying the pawls 25 for turning a toothed rachet wheel 26 in a well-known manner; the rate of turning of the wheel 26 is constant. The wheel 26 may drive a brush wheel 27, carried on a shaft 28, which in turn, by gearing 29, operates a continuous recorder 30; and the shaft 28 may be arranged to move in a direction radial to wheel 26 by an electric meter of the sort illustrated in my prior application No. 799,320, filed Nov. 5, 1913, for a watt meter. That is, the position of the brush wheel 27, with respect to the center of the wheel 26, will depend on the power of the current being measured, while the turning of the wheel 26 will be accurately regulated in point of time, and independent of any changes of temperature.

The instrument is of particular value in such a connection, because, without the expense of a continuously indicating time marker, such as a clock, I obtain a strictly and constantly accurate movement of the indicating gearing at long intervals of time, so that I am able to indicate the "logarithmic average demand" over the time interval, as described in my said previous application No. 799,320 (now Patent No. 1,156,412). That is, it will be understood that if the bar 28 has a movement proportional to watts, and governed by quantity varying by a certain logarithmic law with relation to the average demand during the time interval of the device, the series of such logarithmic average demands are accurately integrated by this time marker. The combination of a slow-responding wattmeter, and the interval marker, I do not, however, claim in this application, but the same is claimed in my divisional application, No. 42,176, filed July 27th, 1915.

It will be understood, of course, that the orifice 11 will be placed in the top leg 12ª, when using a gas to regulate the motion of the U-tube. While the viscosity of liquids decreases with increasing temperature, the viscosity of gases increases with increasing temperature. Consequently, the form of the orifice 11 will be arranged so as to be contracted or enlarged with a rise of temperature, depending upon whether the fluid employed is a liquid or a gas. I have found that mercury may be used to advantage, and in this case the remainder of the tube or upper part thereof may be filled with alcohol; the orifice 11 may be placed in the upper leg 12ª of the tube, instead of on the bottom leg. Whatever material is used, I arrange the form of the opening 11 to accord with the viscosity-temperature curve of the material being used. For example, a form of the opening, as shown in Fig. 1ª, will be used where the increase of viscosity is greater than the increase of temperature expansion of the rod 14, so that the orifice 11ª must grow smaller at an increasing rate. It may be made to grow smaller at a decreasing rate in other cases, as in Fig. 1ᵇ; or otherwise it may vary to suit the conditions of the fluid employed and the expansion of rod 14. (See Fig. 1ᶜ.)

In Fig. 1ᵈ I have shown a device by which the temperature correction is made, not by varying the size of the orifice, but by varying the quantity of liquid which may flow before the shifting of the U-tube; that is, by varying the point of time at which the flow is to change directions. Thus, instead of using the bar 14, in Fig. 1, the orifice 11 may be fixed and the electric contact device 32 may be supported on an expansion bar 31, so that as the temperature rises, making the liquid less viscous, the electric contact will be made later by raising the position of the electrode 32. Otherwise, of course, the supporting rod 31, carrying contact 32, may be so arranged that as it expands with temperature, it accelerates the time of breaking the electric circuit.

In Fig. 2, I show a mechanism operating on the hour glass principle. On the properly supported shaft 33, I provide two hoppers, 34 and 35, communicating by an orifice 36; while surrounding the two hoppers is a sliding envelop 37 supported on springs 38 and 39, carried by arms 40 and 41, fixed on the shaft 33. Obviously, as the material S passes through the orifice 36, and drops on the bottom of the envelop 37, the latter is increased in weight; and when the tension of the spring 38 is overcome, the downward movement of the envelop 37 will bring the contact 42 down on the conductor rod 43 and make the electric circuit of a suitable source 44, and excite the solenoid 45. The plunger of the solenoid will then be drawn upward, and by means of the rack 46, and pinion 47 on the shaft 33, the shaft 33 and the arms 40, 41, will be turned through an angle of 180°, whereupon the operation will be repeated. The solenoid core 45ª and rack 46 may drop again to normal position by action of the rachet connection 33ª. In each upward movement, a spring dog 48 engages the toothed wheel 26 and turns it, thus actuating the brush wheel 27 of a meter recorder as before described.

If the rate at which the material S flows through the orifice 36 is affected by temperature, as, for example, if it were mercury, I compensate by varying the size of the orifice by the elongation of the shank 51 of a plug 52, as the temperature rises.

Another form of timing device is shown in Fig. 4. Here I use a tube 53, which is filled in part by a liquid and in part by a gas and arranged so that both the gas and the liquid must flow through the orifices 54 and 55, respectively, as the tube 53 is tilted on the pivot 56 by means of the plunger 57 of solenoids 58 and 59, as will be obvious. As before, I make use of a float 60, which, when raised, makes a contact 61, connecting the solenoids in the electric circuit, as shown. It will be seen that the time required for the liquid to pass through the orifice 55 will decrease with rising temperature, while the time for the gas to pass through the orifice 54 will increase with rising temperature. But since the liquid cannot reach the float and close the switch to operate the tilting mechanism until the gas has passed the orifice 54, I may adjust the sizes of these two openings to compensate and make the rate of tilting independent of the temperature.

It will be understood that I am not limited to any particular means for tilting the tubes described, nor of varying the orifice, nor of transmitting the motion of the tilting tube to recording mechanism. The essential point is the provision of the time-measuring device on the clepsydra principle in which there is an accompanying compensation of any change in viscosity of the flowing material, and especially the use of this method of time-measuring, with a slow responding electric meter in order to make an efficient integrating meter.

The intermittent timing device herein set forth has a further advantage in being entirely electrically operated and requiring no winding or other attention such as clocks and the like, making it of peculiar value for use with simple integrating meters.

Having thus described my invention and illustrated its uses, what I claim as new is the following:

1. A time measuring device comprising a fluid container arranged to periodically change position to cause the fluid to flow in opposite directions therein through a restricted passage, means to alter the position of the vessel, and means governed by temperature to compensate for changes of viscosity in the fluid due to changes of temperature.

2. A time measuring device comprising a fluid container arranged to periodically change position to cause the fluid to flow in opposite directions therein through a restricted passage, means to alter the position of the vessel, and means governed by temperature to alter the size of said passage, whereby to compensate for changes of viscosity in the fluid due to changes of temperature.

3. A time measuring device comprising a fluid container mounted on a pivot to rock for transporting fluid from one side to the other, automatic mechanism for rocking the container, and float operated switch controlling the actuating mechanism, mechanism for rotating a driven element by the rocking of the container, and compensating means to vary the rate of flow of said fluid automatically with variations of viscosity of the fluid, whereby said rotating driven element is moved periodically with constant motion independent of the temperature of the fluid in the container.

4. A time measuring device comprising a vessel containing a shifting body of liquid, means to rock said vessel, and a rotating wheel operated by the shifting of the vessel, said vessel having an orifice through which the liquid flows, comprising a movable member mounted on an expansion support, and adapted to change the size of the orifice in proportion with the changes of viscosity of the flowing liquid, substantially as described.

5. A time measuring device for electric meters, comprising the combination with a rotating wheel, of means to constantly rotate said wheel at a rate independent of temperature, comprising a rocking vessel containing a fluid and a gas, automatic mechanism to rock the vessel, an orifice in the vessel through which the liquid must pass, and a separate orifice through which the gas must pass, said orifice being arranged with respect to the viscosity of the fluid to render the change of flow of the two fluids taken together through such orifices independent of the temperature of the fluids, substantially as described.

6. A time measuring device, comprising a vessel having a circumferentially closed passage partially filled with liquid and partially by gas, automatic mechanism for rocking the vessel to shift the position of the liquid and gas, float devices in the vessel operated by the liquid to automatically control the rocking mechanism, means to automatically compensate the time of flow of the liquid for changes of temperature thereof, and a rotating wheel actuated by the rocking of said vessel, substantially as described.

7. A time-measuring device comprising a fluid-containing receptacle having a restricted passageway between portions thereof, means for so changing the position of the receptacle that the fluid alternately flows from one portion to the other, and expansion means for automatically varying the capacity of the passageway to compensate for changes of viscosity in the fluid.

8. A time-measuring device comprising a vessel having a passageway partially filled by liquid and partially by gas, means for oscillating said vessel to shift the position of the liquid and the gas, means controlled by the position of the liquid in the vessel to control the oscillating means, and means for automatically compensating the time of flow of the liquid for changes of temperature thereof.

9. A time-measuring device comprising a fluid-containing receptacle having a restricted passageway between two portions thereof, means for causing the fluid to flow in opposite directions through the passageway, and means for automatically compensating for the changes of viscosity in the fluid that are caused by changes in temperature.

10. A time-measuring device comprising a fluid-containing receptacle having a restricted passageway between two portions thereof, means for causing the fluid to flow in opposite directions through the passageway, automatic means for varying the size of the passageway in accordance with the changes of viscosity in the fluid that are caused by changes in temperature.

11. The combination with a fluid-containing receptacle having two compartments with a restricted passageway therebetween, of means for causing the fluid to alternately flow from one compartment to the other, and automatic means for varying the size of the passageway in accordance with the temperature to which the device is subjected.

12. The combination with a fluid-containing receptacle having two compartments with a restricted passageway therebetween, of means for causing the fluid to alternately flow from one compartment to the other, and automatic means for varying the size of the passageway in accordance with the changes of viscosity in the fluid that are caused by changes in temperature.

In testimony whereof, I have hereunto subscribed my name, in the presence of two subscribing witnesses.

PAUL M. LINCOLN.

Witnesses:
G. BOWMAN,
M. HANNAFORD.